United States Patent [19]
Licht et al.

[11] Patent Number: 5,840,823
[45] Date of Patent: Nov. 24, 1998

[54] AQUEOUS POLYURETHANE DISPERSIONS HAVING LATENT CROSSLINKING PROPERTIES

[75] Inventors: Ulrike Licht, Mannheim; Nicolas Kokel, Ludwigshafen; Karl Häberle, Speyer; Renate Wüstefeld, Schifferstadt, all of Germany

[73] Assignee: BASF Aktiengesellschaft, Ludwigshafen, Germany

[21] Appl. No.: 804,690

[22] Filed: Feb. 25, 1997

[30] Foreign Application Priority Data

Mar. 6, 1996 [DE] Germany ............... 196 08 610.8

[51] Int. Cl.$^6$ ........................... C08G 18/67
[52] U.S. Cl. ................. 528/73; 525/455; 525/458; 528/376; 528/392; 524/507; 524/840; 522/98
[58] Field of Search ............... 525/455, 458; 528/73, 392, 376; 524/507, 840; 522/98

[56] References Cited

U.S. PATENT DOCUMENTS

| 5,236,967 | 8/1993 | Ohkawa | 522/32 |
| 5,306,764 | 4/1994 | Chen | 524/591 |

FOREIGN PATENT DOCUMENTS

| 0183119 | 6/1986 | European Pat. Off. |
| 0184302 | 6/1986 | European Pat. Off. |
| 044357A2 | 8/1991 | European Pat. Off. |
| 0704469 A2 | 4/1996 | European Pat. Off. |
| 0794204 | 9/1997 | European Pat. Off. |

*Primary Examiner*—Rachel Gorr
*Attorney, Agent, or Firm*—Oblon, Spivak, McClelland, Maier & Neustadt, P.C.

[57] ABSTRACT

Aqueous polyurethane dispersions having latent crosslinking properties contain

I) a disperse phase (P.I), containing

Ia) a polyurethane (PUR.Ia) which, in addition to groups which impart water dispersibility to the polyurethane, carries groups which have a C—C double bond and in which the double bond is activated by a carbonyl group bonded directly therewith, or Ib) a mixture of a polyurethane (PUR.Ib) which carries groups which impart water dispersibility to the polyurethane but not groups which have a C—C double bond and in which the double bond is activated by a carbonyl group bonded directly therewith and a compound (V.I) which differs from the polyurethanes PUR.Ia and PUR.Ib, and which carries groups which have a C—C double bond and in which the double bond is activated by a carbonyl group bonded directly therewith and II) a disperse phase (P.II) containing a compound which differs from the compounds (PUR.Ia), (PUR.Ib) and (V.I) and which carries a plurality of groups selected from the group consisting of the thiol groups, primary amino groups and secondary amino groups.

10 Claims, No Drawings

AQUEOUS POLYURETHANE DISPERSIONS HAVING LATENT CROSSLINKING PROPERTIES

DESCRIPTION

The present invention relates to aqueous polyurethane dispersions having latent crosslinking properties, containing I) a disperse phase (P.I), containing Ia) a polyurethane (PUR.Ia) which, in addition to groups which impart water dispersibility to the polyurethane, carries groups which have a C—C double bond and in which the double bond is activated by a carbonyl group bonded directly therewith, or Ib) a mixture of a polyurethane (PUR.Ib) which carries groups which impart water dispersibility to the polyurethane but not groups which have a C—C double bond and in which the double bond is activated by a carbonyl group bonded directly therewith and a compound (V.I) which differs from the polyurethanes PUR.Ia and PUR.Ib and which carries groups which have a C—C double bond and in which the double bond is activated by a carbonyl group bonded directly therewith and II) a disperse phase (P.II) containing a compound which differs from the compounds (PUR.Ia), (PUR.Ib) and (V.I) and which carries a plurality of groups selected from the group consisting of the thiol groups, primary amino groups and secondary amino groups.

The present invention furthermore relates to their use as coating material or adhesive.

Aqueous dispersions which contain a polyurethane in dispersed form are generally known. To ensure that coatings produced from polyurethane have particularly good mechanical properties, a crosslinking component is added to these dispersions. It is particularly desirable that the crosslinking agent does not increase the molecular weight of the polyurethane until the polyurethane dispersion has already formed a film after application to the workpiece to be coated. Under these conditions, films which have a particularly high cohesion are obtained since in this case the polymer molecules of a dispersion particle can also be linked to the polymer molecules of another neighboring dispersion particle via a covalent bond.

Particularly good cohesion of the film is required, for example in the adhesive sector, particularly when the adhesive bond is subjected to a mechanical load under the action of heat.

In order to obtain adhesive bonds which have still sufficient strength even under these conditions, it was recommended, for example in EP-A-206059, that a water-emulsifiable polyisocyanate be added as a crosslinking agent to the dispersions shortly before the latter are processed to give an adhesive.

The disadvantage of these two-component systems is that the pot life, ie. the period in which these systems can be processed after they have been mixed, is very limited. Since the two-component system cannot be stored over a prolonged period and the processor must additionally produce a certain amount of adhesive which he is able to process within a working cycle, the work entailed for the processor of the adhesives is greater in the case of two-component systems than one-component systems.

Dispersions which can be stored over a prolonged period and have latent curing properties, ie. those dispersions which contain the curing agent but in which the curing agent becomes fully effective only after processing of the dispersions, are disclosed, for example, in EP-A-442 652. The dispersions contain, for example, a polyurethane having an aldehyde or keto carbonyl group and adipic dihydrazide as a crosslinking agent. However, these dispersions are in need of improvement with regard to strength at elevated temperature.

EP-A-443 537 discloses aqueous dispersions of polyurethanes which carry acryloyl groups. It is recommended that these dispersions be used for film lamination. The dispersion is applied to the film, the film is adhesively bonded to another substrate and the adhesive is cured by exposure to UV light.

Furthermore, polyurethane dispersions having acryloyl groups are disclosed in EP-A-443 537, 183 119, 181 486, 189 945 and 353 797.

EP-A-601 764 discloses polyurethane dispersions which carry primary and/or secondary amino groups. These dispersions are prepared by dispersing a prepolymer having isocyanate groups in water and adding a polyamine having at least 2 primary amino groups and at least one secondary amino group to the aqueous dispersion. According to this publication, these dispersions can be crosslinked with an epoxy resin, a melamine resin or a blocked polyisocyanate.

It is an object of the present invention to provide a further aqueous polyurethane dispersion having latent curing properties which does not have the disadvantages of the prior art and in particular has a long shelf life and with which heat-resistant adhesive bonds can be produced.

We have found that this object is achieved by the aqueous dispersions defined at the outset.

The disperse phase (P.Ia) usually contains from 0.05 to 3, preferably from 0.2 to 1, mol/kg of groups which have a C—C double bond and in which the double bond is activated by a carbonyl group bonded directly therewith.

The phase (P.I) preferably contains or particularly preferably consists of a polyurethane (PUR.Ia) composed of a1) polyfunctional isocyanates of 4 to 30 carbon atoms, a2) polyols, of which a2.1) from 10 to 100 mol %, based on the total amount of the polyols (a2), have a molecular weight of from 500 to 5000 and a2.2) from 0 to 90 mol %, based on the total amount of the polyols (a2), have a molecular weight of from 60 to 500 g/mol, a3) monomers which differ from the monomers (a1) and (a2) and have at least one isocyanate group or at least one group reactive toward isocyanate groups and furthermore carry at least one hydrophilic group or one potentially hydrophilic group, imparting water-dispersibility to the polyurethanes, a4) monomers which differ from the monomers (a1), (a2) and (a3) and have at least one isocyanate group or at least one group reactive toward isocyanate groups and furthermore carry at least one group which has a C—C double bond and in which the double bond is activated by a carbonyl group bonded directly therewith, and a5) if required, further polyfunctional compounds which differ from the monomers (a2) to (a4) and have groups which are reactive toward isocyanate groups and which are alcoholic hydroxyl groups or primary or secondary amino groups.

Suitable monomers (a1) are the polyisocyanates usually used in polyurethane chemistry.

Particular examples are diisocyanates $X(NCO)_2$, where X is an aliphatic hydrocarbon radical of 4 to 12 carbon atoms, a cycloaliphatic or aromatic hydrocarbon radical of 6 to 15 carbon atoms or an araliphatic hydrocarbon radical of 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4'-diisocyanatotoluene, 2,6-diisocyanatotoluene, 4,4'-diisocyanatodiphenylmethane, 2,4-diisocyanatodiphenylmethane, p-xylylene diisocyanate, the isomers of bis(4-isocyanatocyclohexyl)methane, such as the trans/trans, the cis/cis and the cis/trans isomers, and mixtures consisting of these compounds.

Particularly important mixtures of these isocyanates are the mixtures of the respective structural isomers of diisocyanatotoluene and diisocyanatodiphenylmethane, and the mixture comprising 80 mol % of 2,4-diisocyanatotoluene and 20 mol % of 2,6-diisocyanatotoluene is particularly suitable. Furthermore, the mixtures of aromatic isocyanates, such as 2,4-diisocyanatotoluene and/or 2,6-diisocyanatotoluene with aliphatic or cycloaliphatic isocyanates, such as hexamethylene diisocyanate or IPDI, are particularly advantageous, the preferred mixing ratio of the aliphatic to aromatic isocyanates being from 4:1 to 1:4.

Isocyanates which carry further blocked isocyanate groups, for example uretdione or carbodiimide groups, in addition to the free isocyanate groups may also be used as compounds (a1).

If required, isocyanates which carry only one isocyanate group may also be present. In general, their amount is not more than 10 mol %, based on the total molar amount of the monomers. The monoisocyanates usually carry further functional groups, such as olefinic groups or carbonyl groups, and serve to introduce functional groups into the polyurethane which permit dispersing or crosslinking or further polymer-analogous reaction of the polyurethane. Monomers such as isopropenyl-α,α-dimethylbenzyl isocyanate (TMI) are suitable for this purpose.

For example, trifunctional and tetrafunctional isocyanates may be used for preparing polyurethanes having a certain degree of branching or crosslinking. Such isocyanates are obtained, for example, by reacting difunctional isocyanates with one another and derivatizing some of their isocyanate groups to give allophanate or isocyanurate groups. Commercial compounds are, for example, the isocyanurate or the biuret of hexamethylene diisocyanate.

Suitable polyols (a2) with regard to good film formation and resilience are mainly relatively high molecular weight polyols (a2.1), preferably diols, which have a molecular weight of from about 500 to 5000, preferably from about 100 to 3000, g/mol.

The diols (a2.1) are in particular polyesterpolyols, which are known, for example, from Ullmanns Encyklopädie der technischen Chemie, 4th edition, Volume 19, pages 62 to 65. Preferably used polyesterpolyols are those which are obtained by reacting dihydric alcohols with dibasic carboxylic acids. Instead of the free polycarboxylic acids, it is also possible to use the corresponding polycarboxylic anhydrides or corresponding polycarboxylates of lower alcohols or mixtures thereof for the preparation of the polyesterpolyols. The polycarboxylic acids may be aliphatic, cycloaliphatic, araliphatic, aromatic or heterocyclic and may be unsubstituted or substituted, for example by halogen, and/or unsaturated. Examples of these are suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids. Dicarboxylic acids of the general formula HOOC—$(CH_2)_y$—COOH, where y is from 1 to 20, preferably an even number from 2 to 20, are preferred, for example succinic acid, adipic acid, dodecanedicarboxylic acid and sebacic acid.

Examples of suitable polyhydric alcohols are ethylene glycol, propane-1,2-diol, propane-1,3-diol, butane-1,3-diol, butene-1,4-diol, butyne-1,4-diol, pentane-1,5-diol, neopentylglycol, bis(hydroxymethyl)cyclohexanes, such as 1,4-bis(hydroxymethyl)cyclohexane, 2-methylpropane-1,3-diol, methylpentanediols and diethylene glycol, triethylene glycol, tetraethylene glycol, polyethylene glycol, dipropylene glycol, polypropylene glycol, dibutylene glycol and polybutylene glycols. Alcohols of the general formula HO—$(CH_2)_x$—OH, where x is from 1 to 20, preferably an even number from 2 to 20 are preferred. Examples of these are ethylene glycol, butane-1,4-diol, hexane-1,6-diol, octane-1,8-diol and dodecane-1,12-diol.

Polycarbonate-diols, as can be obtained, for example, by reacting phosgene with an excess of the low molecular weight alcohols mentioned as components for the polyesterpolyols, are also suitable.

Lactone-based polyesterdiols are also suitable, these being homopolymers or copolymers of lactones, preferably adducts of lactones with suitable difunctional initiator molecules, said adducts having terminal hydroxyl groups. Preferred lactones are those which are derived from compounds of the general formula HO—$(CH_2)_z$—COOH, where z is from 1 to 20. Examples are ε-caprolactone, β-propiolactone, gamma-butyrolactone and/or methyl-ε-caprolactone and mixtures thereof. Suitable initiator components are, for example, the low molecular weight dihydric alcohols stated above as components for the polyesterpolyols. Corresponding polymers of epsilon-caprolactone are particularly preferred. Lower polyesterdiols or polyetherdiols may also be used as initiators for the preparation of the lactone polymers. Instead of the polymers of lactones, it is also possible to use the corresponding, chemically equivalent polycondensates of the hydroxycarboxylic acids corresponding to the lactones.

Suitable monomers (a2.1) are polyetherdiols. They are obtainable, in particular, by homopolymerization of ethylene oxide, propylene oxide, butylene oxide, tetrahydrofuran, styrene oxide or epichlorohydrin, for example in the presence of $BF_3$, or by subjecting these compounds, if required as a mixture or in succession, to an addition reaction with initiator components having reactive hydrogen atoms, such as alcohols or amines, eg. water, ethylene glycol, propane-1,2-diol, propane-1,3-diol, 1,2-bis(4-hydroxydiphenyl) propane or aniline. Polytetrahydrofuran having a molecular weight of from 240 to 5000, especially from 500 to 4500, is particularly preferred.

Polyhydroxyolefins are also suitable as monomers (a2.1), preferably those having 2 terminal hydroxyl groups, eg. α-Ω-dihydroxypolybutadiene, α-Ω-dihydroxypolymethacrylates or α-Ω-dihydroxypolyacrylate. Such compounds are disclosed, for example, in EP-A-0 622 378. Further suitable polyols are polyacetals, polysiloxanes and alkyd resins.

The polyols may also be used as mixtures in a ratio of from 0.1:1 to 1:9.

The hardness and the modulus of elasticity of the polyurethanes can be increased if, in addition to the diols (a2.1), low molecular weight diols (a2.2) having a molecular weight of from about 62 to 500, preferably from 62 to 200, g/mol are also used as diols (a2). In particular, the components of the short-chain alkanediols stated for the preparation of polyesterpolyols are used as monomers (a2.2), the straight-chain diols having an even number of carbon atoms from 2 to 12 being preferred.

The amount of the diols (a2.1) is preferably from 10 to 100 mol %, based on the total amount of the diols (a2), and the amount of the monomers (a2.2) is preferably from 0 to 90 mol %, based on the total amount of the diols (a2). Particularly preferably, the ratio of the diols (a2.1) to the monomers (a2.2) is from 0.2:1 to 5:1, particularly preferably from 0.5:1 to 2:1.

In order to impart water dispersibility to the polyurethanes, the latter are composed of monomers (a3) which differ from the components (a1) and (a2) and carry at least one isocyanate group or at least one group reactive toward isocyanate groups and furthermore at least one hydrophilic group or one group which can be converted into hydrophilic groups, in addition to the components (a1) and (a2). Below, the term "hydrophilic groups or potentially hydrophilic groups" is abbreviated to "(potentially) hydrophilic groups". The (potentially) hydrophilic groups react with isocyanates substantially more slowly than the functional groups of the monomers used for synthesizing the polymer main chain.

The proportion of components having (potentially) hydrophilic groups in the total amount of components (a1) to (a5) is in general such that the molar amount of the (potentially) hydrophilic groups is from 0.03 to 1, preferably from 0.05 to 0.5, particularly preferably from 0.08 to 0.3, mol/kg, based on the amount by weight of all monomers (a1) to (a5).

The (potentially) hydrophilic groups may be nonionic or, preferably, (potentially) ionic hydrophilic groups.

Particularly suitable nonionic hydrophilic groups are polyethylene glycol ethers comprising, preferably, from 5 to 100, especially from 10 to 80, repeating ethylene oxide units. The content of polyethylene oxide units is in general from 0 to 10, preferably from 0 to 6% by weight, based on the amount by weight of all monomers (a1) to (a5).

Preferred monomers having nonionic hydrophilic groups are polyethylene glycol and diisocyanates which carry a terminal etherified polyethylene glycol radical. Such diisocyanates and processes for their preparation are described in U.S. Pat. Nos. 3,905,929 and 3,920,598.

Ionic hydrophilic groups are in particular anionic groups, such as the sulfonate, carboxylate and phosphate group in the form of their alkali metal or ammonium salts, and cationic groups, such as ammonium groups, in particular protonated tertiary amino or quaternary ammonium groups.

Potentially ionic hydrophilic groups are in particular those which can be converted by simple neutralization, hydrolysis or quaternization reactions into the abovementioned ionic hydrophilic groups, for example carboxyl, anhydride or tertiary amino groups.

(Potentially) ionic monomers (a3) are described in detail, for example, in Ullmanns Encyklopädie der technischen Chemie, 4th edition, Volume 19, pages 311–313, and, for example, in DE-A 1 495 745.

Of particular practical importance as (potentially) cationic monomers (a3) are monomers having tertiary amino groups, for example tris(hydroxyalkyl)amines, N,N'-bis (hydroxyalkyl)alkylamines, N-hydroxyalkyldialkylamines, tris(aminoalkyl)amines, N,N'-bis(aminoalkyl)alkylamines and N-aminoalkyldialkylamines, the alkyl radicals and alkanediyl units of these tertiary amines, independently of one another, consisting of 2 to 6 carbon atoms. Also suitable are polyethers having tertiary nitrogen atoms and preferably having two terminal hydroxyl groups, as obtainable in a conventional manner by alkoxylation of amines having two hydrogen atoms bonded to amine nitrogen, eg. methylamine, aniline or N,N'-dimethylhydrazine. Such polyethers generally have a molecular weight of from 500 to 6000 g/mol.

These tertiary amines are converted into the ammonium salts either with acids, preferably strong mineral acids, such as phosphoric acid, sulfuric acid or hydrohalic acids, or strong organic acids or by reaction with suitable quaternizing agents, such as $C_1$–$C_6$-alkyl halides, for example bromides or chlorides.

Aliphatic, cycloaliphatic, araliphatic or aromatic carboxylic acids and sulfonic acids which carry at least one alcoholic hydroxyl group or at least one primary or secondary amino group are usually suitable as monomers having (potentially) anionic groups.

Dihydroxyalkylcarboxylic acids, especially of 3 to 10 carbon atoms, as also described in U.S. Pat. No. 3,412,054, are preferred. Compounds of the general formula

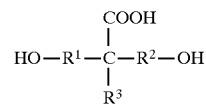

where $R^1$ and $R^2$ are each a $C_1$–$C_4$-alkanediyl unit and $R^3$ is a $C_1$–$C_4$-alkyl unit, are particularly preferred, especially dimethylolpropionic acid (DMPA).

Corresponding dihydroxysulfonic acids and dihydroxyphosphonic acids, such as 2,3-dihydroxypropanephosphonic acid, are also suitable.

Dihydroxy compounds having a molecular weight of from 500 to 10000 g/mol and at least 2 carboxylate groups are also suitable, said compounds being disclosed in DE-A 3 911 827. They are obtainable by subjecting dihydroxy compounds to a polyaddition reaction with tetracarboxylic dianhydrides, such as pyromellitic dianhydride or cyclopentanetetracarboxylic dianhydride, in a molar ratio of from 2:1 to 1.05:1. Particularly suitable dihydroxy compounds are the monomers (a2.2) mentioned as chain extenders and the diols (a2.1).

Suitable monomers (a3) having amino groups reactive toward isocyanates are aminocarboxylic acids, such as lysine, β-alanine, the adducts, stated in DE-A 2 034 479, of aliphatic diprimary diamines with α,β-unsaturated carboxylic acids, such as N-(2-aminoethyl)-2-aminoethanecarboxylic acid and the corresponding N-aminoalkylaminoalkylcarboxylic acids, the alkanediyl units consisting of 2 to 6 carbon atoms.

If monomers having potentially ionic groups are used, they may be converted into the ionic form before, during or, preferably, after the isocyanate polyaddition, since the ionic monomers are frequently only sparingly soluble in the reaction mixture. The carboxylate groups are particularly preferably in the form of their salts with an alkali metal ion or an ammonium ion as the opposite ion.

Particularly suitable monomers (a4) differing from the monomers (a2) and (a3) are compounds having one alcoholic hydroxyl group, preferably 2 alcoholic hydroxyl groups, such as hydroxy-$C_1$–$C_6$-alkyl acrylates, eg. hydroxyethyl acrylate and hydroxypropyl acrylate, hydroxy-$C_1$–$C_6$-alkyl methacrylate, mono- or diesters of acrylic acid or methacrylic acid and trimethylolpropane or glycerol or the bisadduct of acrylic acid and/or methacrylic acid with a bisepoxide such as bisphenol (R) A and bisphenol F.

The adduct of acrylic or methacrylic acid and butanediol diglycidyl ether is also particularly suitable.

Other suitable monomers (a4) are conventional polyesterpolyols which are composed at least partly of maleic acid and fumaric acid. Otherwise, these polyesters have the same composition as the polyesters which are suitable as monomers (a2.2).

The monomers (a5) which may be used as components and differ from the monomers (a2) to (a4) are used in general for crosslinking or chain extension. They are in general trihydric or polyhydric nonaromatic alcohols, amines having 2 or more primary and/or secondary amino groups and compounds which carry one or more primary and/or secondary amino groups in addition to one or more alcoholic hydroxyl groups.

Alcohols which have a functionality of more than 2 and may be used for establishing a certain degree of branching or crosslinking are, for example, trimethylolpropane, glycerol and sugar.

Monoalcohols which, in addition to the hydroxyl group, carry a further group reactive toward isocyanates, such as monoalcohols having one or more primary and/or secondary amino groups, eg. monoethanolamine, are also suitable.

Polyamines having 2 or more primary and/or secondary amino groups are used particularly when the chain extension or crosslinking is to be carried out in the presence of water, since amines generally react more rapidly than alcohols or water with isocyanates. This is often necessary when aqueous dispersions of crosslinked polyurethanes or polyurethanes having a high molecular weight are desired. In such cases, the prepolymer having isocyanate groups is prepared, rapidly dispersed in water and then subjected to chain extension or crosslinking by adding compounds having a plurality of amino groups reactive toward isocyanates.

Amines suitable for this purpose are in general polyfunctional amines having a molecular weight of from 32 to 500, preferably from 60 to 300, g/mol, which contain at least two primary amino groups, two secondary amino groups or one primary and one secondary amino group. Examples of these diamines are diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine and hydrazine hydrate, and triamines, such as diethylenetriamine and 1,8-diamino-4-aminomethyloctane.

The amines may also be used in blocked form, for example in the form of the corresponding ketimines (cf. for example CA-1 129 128), ketazines (cf. for example U.S. Pat. No. 4,269,748) or amine salts (cf. U.S. Pat. No. 4,292,226). Oxazolidines, ash for example in U.S. Pat. No. 4,192,937, are also block polyamines which may be used in the preparation of the novel polyurethanes for chain extension of the prepolymers. When such blocked polyamines are used, they are generally mixed with the prepolymers in the absence of water and the mixture is then mixed with the dispersing water or a part of the dispersing water so that the corresponding polyamines are liberated hydrolytically.

Mixtures of di- and triamines are preferably used, particularly preferably mixtures of isophoronediamine and diethylenetriamine.

The polyurethanes preferably contain no polyamine or from 1 to 10, particularly preferably from 4 to 8, mol %, based on the total amount of component (a2) to (a4), of a polyamine having at least 2 amino groups reactive toward isocyanates, as monomers (a5).

It is advisable to use compounds having primary or secondary amino groups only in amounts such that the total amount of the isocyanate groups present at the time of the addition is greater than that of the primary or secondary amino groups. Under these conditions, it is possible to avoid the situation where a relatively large proportion of the amino groups do not react with the isocyanate groups to give urea but with the acryloyl or methacryloyl groups.

In another preferred embodiment, the phase (P.I) contains or consists of a mixture of a polyurethane (PUR.Ib) and
a polyurethane (PUR.Ic) as compound (V.I),
the polyurethane (PUR.Ib) being composed of
b1) polyfunctional isocyanates of 4 to 30 carbon atoms,
b2) polyols, of which
  b2.1) from 10 to 100 mol %, based on the total amount of the diols (b2), have a molecular weight of from 500 to 5000 and
  b2.2) from 0 to 90 mol %, based on the total amount of the diols (b), have a molecular weight of from 60 to 500 g/mol,
b3) monomers which differ from the monomers (b1) and (b2) and have at least one isocyanate group or at least one group reactive toward isocyanate groups and furthermore carry at least one hydrophilic group or one potentially hydrophilic group, imparting water-dispersibility to the polyurethanes,
b4) if required, further polyfunctional compounds which differ from the polyols (b2) and monomers (b3) and have groups which are reactive toward isocyanate and are alcoholic hydroxyl groups or primary or secondary amino groups,
and the polyurethane (PUR.Ic) being composed of
c1) polyfunctional isocyanates of 4 to 30 carbon atoms,
c2) polyols, of which
  c2.1) from 10 to 100 mol %, based on the total amount of the diols (c2), have a molecular weight of from 500 to 5000 and
  c2.2) from 0 to 90 mol %, based on the total amount of the diols (c2), have a molecular weight of from 60 to 500 g/mol, and
c3) monomers which differ from the monomers (c1) and (c2) and have at least one isocyanate group or at least one group reactive toward isocyanate groups and furthermore carry at least one acryloyl or methacryloyl group.

The ratio of the polyurethane (PUR.Ib) to compound (V.I) is in general from 0.5:1 to 10:1.

Particularly suitable monomers (b1), (b2), (b3) and (b4) are the corresponding monomers which are preferred as monomers (a1), (a2), (a3) and (a5).

Particularly suitable monomers (c1), (c2.1), (c2.2) and (c3) are the corresponding monomers which are preferred as monomers (a1), (a2.1), (a2.2) and (a4).

The monomers (c3) are preferably used in amounts such that the polyurethane (PUR.Ic) contains, per kg of polyurethane (PUR.Ic), from 0.2 to 4 mol of groups which have a C—C double bond and in which the double bond is activated by a directly bonded carbonyl group.

The disperse phase (P.I) may also contain, as compounds (V.I), acryloyl- or methacryloyl-containing esters disclosed in EP-A-447 845, 279 303 or 127 766.

These are preferably esters obtainable by reacting
polyols as described as monomers (a2.1) and (a2.2), and
low molecular weight higher alcohols, such as glycerol, trimethylolpropane and pentaerythritol, these alcohols being, if required, ethoxylated or propoxylated,
dibasic to tetrabasic $C_3$–$C_{36}$-carboxylic acids, eg. adipic acid, and
acrylic and/or methacrylic acid,
to give a carboxyl-containing polyester, and then esterifying the carboxyl groups of this ester by reaction with an equivalent amount of an epoxide compound.

Particularly suitable compounds (V.I) are those which have a solubility of at least 5% by weight at 20° C. in a solvent in which the preparation of the polyurethanes (PUR.Ia) is usually carried out and carry, per 100 g, from 0.1 to 1 mol groups which have a C—C double bond and in which the double bond is activated by a carbonyl group directly bonded therewith.

Preferably, both the polyurethane (PUR.Ia) and the compound (V.I) have a solubility in water of less than 5, preferably less than 1, g/l (measured at 20° C.).

The manner in which the molecular weight of the polyurethanes can be adjusted by the choice of the amounts of the monomers which are reactive with one another and the arithmetic mean of the number of reactive functional groups per molecule is generally known in the area of polyurethane chemistry.

Usually, the components (a1) to (a5) or (b1) to (b4) and their respective molar amounts are chosen so that the ratio A:B, where
A) is the molar amount of isocyanate groups and
B) is the sum of the molar amount of the hydroxyl groups and the molar amount of functional groups capable of reacting with isocyanates in an addition reaction,
is from 0.5:1 to 2:1, preferably from 0.8:1 to 1.5, particularly preferably from 0.9:1 to 1.2:1. Very particularly preferably, the ratio A:B is as close as possible to 1:1.

The monomers (a4) are preferably used in amounts such that the polyurethane (PUR.Ia) contains, per kg of polyurethane (PUR.Ia), from 0.05 to 3, particularly preferably from 0.2 to 1, mol of groups which have a C—C double bond and in which the double bond is activated by a carbonyl group directly bonded therewith.

The novel dispersions can be prepared in a simple manner by mixing a dispersion (D.I), containing, in disperse form, a polyurethane having groups which have a C—C double bond and in which the double bond is activated by a directly bonded carbonyl group (disperse phase P.I), this dispersion (D.I), however, being free of water-insoluble compounds in dispersed form which carry 2 groups selected from the group consisting of the thiol, primary amino and secondary amino groups (disperse phase P.II), with a dispersion (D.II) containing disperse phase (P.II) but not disperse phase (P.I).

The mixing of the two dispersions is not critical and can be carried out, for example, by stirring one dispersion into the other. The dispersions should have a charge of the same sign.

Dispersions (D.I) which contain a polyurethane (PUR.Ia) which has a C—C double bond and in which the double bond is activated by a directly bonded carbonyl group and which carry acryloyl or methacryloyl groups are generally known (cf. EP-A-443 537, 183 119, 181 486, 189 945 and 353 797).

In general, the dispersions (D.I) are prepared by one of the following processes:

In the "acetone process", a water-dispersible polyurethane is prepared from the components (a1) to (a5) or (b1) to (b4) in a water-miscible solvent which boils below 100° C. at atmospheric pressure. Water is added in an amount sufficient to form a dispersion in which water is the continuous phase.

The "prepolymer mixing process" differs from the acetone process in that a water-dispersible prepolymer which carries isocyanate groups is first prepared instead of a (potentially) water-dispersible polyurethane which has reacted completely. The components (a1) to (a5) or (b1) to (b4) are chosen so that the ratio A:B according to the definition is greater than from 1.0 to 3, preferably from 1.05 to 1.5. The prepolymer is first dispersed in water and then, if required, crosslinked by reaction of the isocyanate groups with amines which carry more than 2 amino groups active toward isocyanates, or subjected to a chain extension reaction with amines which carry 2 amino groups reactive toward isocyanates. Chain extension also takes place when no amine is added. In this case, isocyanate groups are hydrolyzed to amino groups, which react with remaining isocyanate groups of the prepolymers with chain extension.

In the case of the prepolymer of the monomers (b1) to (b4), the stoichiometric ratio of the starting materials and the reaction time are preferably chosen so that, before it is dispersed, the prepolymer contains less than 0.1% by weight of NCO groups per kg of prepolymer. The initial weight of the NCO groups is 42 g per mol.

The polyaddition of the components (a1) to (a5) or (b1) to (b4) is carried out in general at reaction temperatures of from 20° to 180° C., preferably from 50° to 150° C., under atmospheric or autogenous pressure.

The required reaction times may be from a few minutes to a few hours. The manner in which the reaction time is influenced by a large number of parameters, such as temperature, concentration of the monomers and reactivity of the monomers, is known in polyurethane chemistry.

The conventional catalysts, such as dibutyltin dilaurate, tin(II) octoate or diazabicyclo(2,2,2)octane, may be present in order to accelerate the reaction of the diisocyanates.

Suitable polymerization apparatuses are stirred kettles, particularly when a low viscosity and good removal of heat are ensured by the presence of solvents.

Preferred solvents are infinitely miscible with water, have a boiling point of from 40° to 100° C. at atmospheric pressure and react only slowly with the monomers, if at all.

The dispersions (D.I), which contain a mixture of the polyurethane (PUR.Ib) and the compound (V.I) as the dispese phase (P.I), are advantageously prepared by mixing the polyurethane (PUR.Ib) which has not yet been dispersed in the acetone process and the corresponding prepolymer in the prepolymer mixing process with the compound (V.I) and dispersing these mixtures in water. This method of codispersing results in a disperse phase in which the polyurethane (PUR.Ib) and the compound (V.I) are present side by side, ie. both together in one particle.

This method of codispersing is described, for example, in DE-A-3 903 538, 4 309 079 and 4 0 24 567, using as an example polymers, for example hydrophobic systems, such as phenol condensation resins obtained from aldehydes and phenol or phenol derivatives or epoxy resins.

If a solvent was present in the preparation of the polyurethane, the major part of the solvent is usually removed from the dispersion, for example by distillation under reduced pressure. The dispersions preferably have a solvent content of less than 10% by weight and are particularly preferably free of solvents.

These hydrophobic assistants may also be present in the disperse phase (P.I).

The dispersions (D.I) generally have a solids content of from 10 to 75, preferably from 20 to 65, % by weight and a viscosity of from 10 to 500 mPa.s (measured at 20° C. and a shear rate of 250 s$^{-1}$).

In addition to being prepared by mixing the dispersions (D.I) and (D.II), the novel dispersions may also be prepared by dispersing the prepolymer of polyurethane (PUR.Ia) or the mixture of the prepolymer of polyurethane (PUR.Ib) and compound (V.I) in the case of the prepolymer mixing process and the polyurethane (PUR.Ia) or the mixture of the polyurethane (PUR.Ib) and compound (V.I) in the case of the acetone process directly in an aqueous dispersion (D.II).

The phase (P.II) preferably contains or particularly preferably consists of a polyurethane (PUR.IId) which carries groups which impart water dispersibility to the polyurethane, a polymer (POL.IIa) prepared from monomers capable of free radical polymerization and having C=C double bonds by the method of free radical emulsion or suspension polymerization, or a polymer (POL.IId) which carries groups which impart water dispersibility to the polymer, said polymer being prepared from polymers capable of free radical polymerization and having C=C double bonds by the method of free radical mass or solution polymerization. The polyurethane (PUR.IIa) or the polymer (POL.IIa) or (POL.IIb) preferably carries from 50 to 1000 mmol/kg of primary amino groups, secondary amino groups or thiol groups.

Preferably both the polyurethane (PUR.Id) and the polymer (POL.IIa) (POL.IIb) have a solubility of less than 5, particularly preferably less than 1, g/l in water (measured at 20° C.).

In an embodiment which is likewise preferred, the phase (P.II) contains or consists of a mixture of
- a polyurethane (PUR.IIe) which carries groups which impart water dispersibility to the polyurethane, a polymer (POL.IIc) prepared from monomers capable of free radical polymerization and having C=C double bonds by the method of free radical emulsion or suspension polymerization or a polymer (POL.IId) which carries groups which impart water dispersibility to the polymer, the polymer being prepared from monomers capable of free radical polymerization and having C=C double bonds by the method of free radical mass or solution polymerization, the polyurethane (PUR.IIa) or the polymer (POL.IIc) or (POL.IId) carrying less than 0.05 mmol of primary amino groups, secondary amino groups or thiol groups per kg, and
- a compound (V.II) which carries at least 2 groups selected from the group consisting of the thiol groups, primary amino groups and secondary amino groups and has a solubility of 1 g/l in water and a molecular weight of less than 10000.

Dispersions (D.II) which contain these disperse phases (P.II) and are free of disperse phases (P.I) and give the novel aqueous dispersions as a result of being mixed with dispersions (D.I) are generally known.

A preferably used dispersion (D.II) is a dispersion which contains, as the disperse phase (P.II), a polyurethane (PUR.IId) which is composed of
d1) polyfunctional isocyanates of 4 to 30 carbon atoms,
d2) polyols of which
  d2.1) from 10 to 100 mol %, based on the total amount of the diols (d2), have a molecular weight of from 500 to 5000 and
  d2.2) from 0 to 90 mol %, based on the total amount of the diols (d2), have a molecular weight of from 60 to 500 g/mol,
d3) monomers which differ from the monomers (d1) and (d2) and have at least one isocyanate group or at least one group reactive toward isocyanate groups and in addition carry at least one hydrophilic group or one potentially hydrophilic group, imparting water dispersibility to the polyurethanes, and
d4) compounds which differ from the monomers (d2) and (d3) and have a plurality of groups which are primary amino groups, secondary amino groups or thiol groups.

Particularly suitable monomers (d1) to (d3) are the corresponding monomers which are preferred as monomers (a1) to (a3). Suitable monomers (d4) are the polyfunctional amines which are mentioned as monomers (a5).

Other suitable monomers (d4) are aminoacids and alcohols containing thiol groups, eg. $CH_2SH$—$CH_2OH$ or $CH_2OH$—$CHOH$—$CH_2SH$.

In the preparation of the dispersion (D.II) which contains, as the polyurethane (PUR.IId), one having amino groups as functional groups, the prepolymer mixing process is advantageously used, ie. the monomers (d1) to (d3) are polymerized in the usual manner, the prepolymer is dispersed in water and the monomer (d4) is then added to the dispersion. The amount of monomer (d4) is preferably chosen so that the molar ratio of monomer (d4) to the NCO groups present in the prepolymer is from 0.9:1 to 1.1:1.

Furthermore, dispersions which contain a polyurethane which carries primary and/or secondary amino groups are disclosed in DE-A-2 734 576, DE-A-2 753 942, EP-A-390 370 and EP-A-442 654.

Dispersions (D.II) containing polyurethanes (PUR.IId) having thiol groups are disclosed, for example in DE-A-2 642 073.

These water-insoluble compounds preferably have a water solubility of less than 5, particularly less than 1, g/l in water at 20° C.

Suitable dispersions (D.II) which contain a polymer (POL.IIa) as the disperse phase are primary dispersions which can be obtained when conventional monomers capable of free radical polymerization are polymerized by the method of suspension or emulsion polymerization in an aqueous medium. Isocyanates having double bonds capable of free radical polymerization (for example TMXDI) or thiols suitable as regulators, as disclosed in U.S. Pat. No. 5,227,463, are used for functionalizing the polymers (POL.IIa) having primary amino groups, secondary amino groups or thiol groups.

Other suitable dispersions (D.II) which contain a polymer (POL.IIb) as the disperse phase are secondary dispersions containing (POL.IId) which carries groups which impart water dispersibility to the polymer, eg. carboxyl groups. These dispersions are prepared from conventional monomers capable of free radical polymerization and having C=C double bonds in the presence of acrylic acid and/or methacrylic acid by the method of free radical mass or solution polymerization and are then dispersed in water. For subsequent functionalization with primary amino groups, these dispersions can be reacted with ethyleneimine, as stated in EP-A-341 886.

In an embodiment which is likewise preferred, the dispersion (D.II) used is a dispersion in which the disperse phase (II) contains or preferably consists of a mixture of a polyurethane (PUR.IIe) which particularly preferably has the same composition as the polyurethane (PUR.Ib) and a compound (V.II). The process for the preparation of these dispersions is similar to that for the preparation of dispersions (D.I) which contain a mixture of polyurethane (PUR.Ib) and compound (V.I) as the disperse phase, ie. a mixture of the polyurethane (PUR.IIe) or the prepolymer thereof and the compound (V.II) is dispersed in water.

Suitable dispersions (D.II) are those in which the disperse phase (II) contains or preferably consists of a mixture of a polymer (POL.IId) prepared from monomers capable of free radical polymerization and having C=C double bonds by the method of free radical mass or solution polymerization.

These are in general secondary dispersions which are obtainable by polymerizing, by the mass or solution polymerization method, conventional monomers capable of free radical polymerization and having C=C double bonds, a part of these monomers carrying hydrophilic groups, eg. carboxyl groups. The compound (V.II) is added after the end of the polymerization, during the polymerisation or to the starting materials. Usually, the mixture of the polymer and the compound (V.II) is dispersed in water by being stirred in.

Such dispersions are generally known and are described for example in EP-A-467 908.

Suitable compounds (V.II) are araliphatic $C_6$–$C_{30}$-polyamines or aliphatic $C_4$–$C_{30}$ polyamines, preferably diamines or triamines, and polyesters of a $C_2$–$C_{10}$-alkyl alcohol and a $C_2$–$C_{10}$-thiomonocarboxylic acid, eg. pentaerythrityl tetrakis-3-mercaptopropionate.

The novel polyurethane dispersion may contain further water-emulsifiable or water-dispersible resins, such as polymer resins, polyurethanes, polyester resins, epoxy resins or alkyd resins, and commercial assistants and additives, such as blowing agents, antifoams, emulsifiers, thickeners and thixotropic agents and colorants, such as dyes and pigments.

They are suitable, for example, for adhesive bonding or coating of different substrates, such as wood, metal, plastics, paper, leather or textile, and for the production of moldings and printing inks.

The novel polyurethane dispersions can be processed by the methods usually used in the adhesives and coating industries, ie. by applying the dispersions to the substrate by spraying, rolling or knife coating and then carrying out drying.

For processing as an adhesive, the coated workpieces are preferably joined to another workpiece with application of pressure, either before drying of the dispersion film or after drying.

Particularly strong adhesive bonds are obtained if workpieces which are provided with a dried adhesive film are heated to about 50°–100° C. immediately before, during or after joining.

The adhesive bonds produced by these methods are distinguished in particular by the fact that they are stable and make it possible to produce bonds having high heat distortion resistance.

EXAMPLES

Preparation of a polyurethane dispersion containing a disperse phase P.Ia

Example 1

530 g of a polypropylene oxide diol having an OH number of 56 were reacted with 0.5 g of DBTL, 21.4 g of DMPA, 27.5 g of neopentylglycol and 140.8 g of TDI at 110° C. for 2 hours. After dilution with 880 g of acetone and cooling to 50° C., the NCO value was 0.6%. After neutralization with 17.9 g of 25% strength NaOH, 380 g of a 50% strength acetone solution of an adduct of 2 mol of acrylic acid with 1 mol of bisphenol A bisglycidyl ether were added and the mixture was dispersed with 1200 g of demineralized water. The acetone was distilled off under reduced pressure.
Acrylate content: 0.86 mol/kg solid
Analytical data:
  FC: 40%
  LD: 95
  pH: 8.2
  Viscosity: 373 mPa.s
  K value in NMP: 44

Example 2

565.5 g of a polyester of adipic acid and butanediol, having an OH number of 45 were reacted with 0.15 g of DBTL and 29. g of TDI in 152 g of acetone for 1 hour at 65° C. Thereafter, 28.6 g of HDI were metered in and the mixture was kept at this temperature for a further 37 minutes. Dilution was effected with 609.9 g of acetone and the mixture was cooled to 50° C. The NCO value was 0.65%. Chain extension was carried out with 40.9 g of PUD salt, and 380 g of a 50% strength acetone solution of an adduct of 2 mol of acrylic acid with one mol of bisphenol A bisglycidyl ether were added. Dispersing was then effected with 1200 g of demineralized water. After the acetone had been distilled off under reduced pressure, the mixture was brought to a solids content of 40%.
Acrylate content: 0.826 mol/kg
Analytical data:
  FC: 40%
  LD: 52
  Viscosity: 26 mPas
  pH: 8.8
  K value: 69

Example 3

605.2 g of polypropylene oxide diol (OHN=56), 0.5 g of DBTL, 21.5 g of DMPA and 14.8 g of neopentylglycol were reacted with 139.9 g of TDI for 2 hours at 110° C. 100 g of acetone, 0.1 g of hydroquinone dimethyl ether and 18.6 g of hydroxyethyl acrylate were added and the reaction was continued for a further 2 hours at 90° C. After dilution with 878 g of acetone and cooling to 50° C., the NCO content was 0.48%. Neutralization was effected with 6.4 g of NaOH dissolved in 20 g of demineralized water and dispersing was carried out with 1200 g of demineralized water. The acetone was distilled off under reduced pressure.
Acrylate content: 0.2 mol/kg solid
Analytical data:
  FC: 40%
  LD: 91
  Viscosity: 380 mPas
  pH: 8.7
  K value: 33

Example 4

385.3 g of a polyesterdiol obtained from adipic acid and ethylene glycol (OHN=42), 0.5 g of DBTL, 21.45 g of DMPA, 0.1 g of dimethylhydroquinone and 269.7 g of an adduct of 2 mol of acrylic acid with 1 mol of 1,4-butanediol bisglycidyl ether (Mn=330) were initialy taken and reacted with 123.5 g of TDI for 1 hour at 110° C. Dilution was effected with 977 g of acetone and the mixture was cooled to 50° C. The NCO value had decreased to 0. Neutralization was effected with 6.4 g of NaOH in 20 g of demineralized water and dispersing was carried out with 1200 g of demineralized water. The acetone was distilled off under reduced pressure and the solids content was brought to 40%.
Acrylate content: 2 mol/kg solid
Analytical data:
  FC: 40%
  LD: 94
  Viscosity: 38 mPas
  pH: 7.9
  K value: 32

Preparation of a polyurethane dispersion containing a disperse phase P.II

Example 5

595.1 g of polypropylene oxide diol having an OH number of 56, 0.5 g of DBTL, 30.9 g of neopentylglycol and 21.5 g of DMPA were reacted with 152.5 g of TDI for 2 hours at 110° C. After dilution with 977 g of acetone and cooling to 50° C., the NCO content was 0.5%. Neutralization was effected with 17.9 g of 25% strength NaOH and dispersing was carried out with 1200 g of demineralized water. Immediately after the end of dispersing, 46.9 g of pentaerythrityl tetrakis-3-mercaptopropionate in 100 g of acetone were added dropwise. The acetone was distilled off under reduced pressure and the dispersion was brought to a solids content of 35%.
SH content: 0.24 mol/kg
Analytical data:
  FC: 35%
  LD: 97
  Viscosity: 290 mPas
  pH: 8.4
  K value: 44

Example 6

572.3 g of a polyesterdiol obtained from adipic acid and ethylene glycol (OHN=42), 0.5 g of DBTL, 21.4 g of DMPA and 38.6 g of 1,4-butanediol were reacted with 167.7 g of TDI for 50 minutes at 110° C. Thereafter, dilution was effected with 977 g of acetone and the mixture was cooled to 50° C. The NCO value was now 0.67%. Neutralization was effected with 6.4 g of NaOH in 20 g of demineralized water and dispersing was carried out with 1200 g of demineralized water. Immediately thereafter, 78.2 g of pentaerythrityl tetrakis-3-mercaptopropionate in 100 g of acetone were added dropwise. After the addition of 8 g of a 45% strength solution of polyacrylic acid (pH=7) in 30 g of water, the acetone was distilled off and the dispersion was brought to a solids content of 40%.
Thiol content: 0.4 mol/kg
Analytical data:
  FC: 40%
  LD: 98
  Viscosity: 113 mPas
  pH: 8.6
  K value: undissolved
Preparation of the dispersions containing P.Ia and P.II

Example 7

The dispersions from Example 1 and Example 5 were mixed in ratios such that equivalent amounts of SH and acrylate groups were present. K value: 45.6

A film was cast and was dried for 3 days at 40° C. K value: undissolved particles.

Example 8

100 g of the dispersion from Example 4 and 181.2 g of the dispersion from Example 6 were mixed. K value of the mixture: 44.3. The mixture was cast as a film, which was dried for 3 days at 40° C. K value of the film: undissolved.

Testing of the performance characteristics of the dispersions

The adhesive properties of the dispersions stated in Table 1 were investigated by the following method:

The dispersions were thickened with 2% of Collacral VL, each applied in a thickness of 2 mm to 5 hard particle boards (20 cm×3 cm) by means of a knife coater and dried for 3 minutes at 60° C. An ASA film was then pressed on at 0.5N/mm² for 30 seconds at 80° C.

The heat distortion resistance was determined by means of the peeling strength. After 24 hours, the heat distortion resistance was tested. For this purpose, the ASA film was loaded with a weight of 300 g at a peel-off angle of 180°. The temperature was increased by 10° C. every 30 minutes. The maximum temperature at which the peeling distance was just less than 50 mm was stated as the heat distortion resistance.

TABLE 1

|  | Heat distortion resistance in °C. |
| --- | --- |
| Example 4 | 4 × 60 |
| Example 6 | 4 × <60 |
| Example 8 | 4 × 80; 1 × 90 |

Abbreviations
  OHN=hydroxyl number
  B14=1,4-butanediol
  TDI=toluylene diisocyanate
  HDI=hexamethylene diisocyanate
  PUD salt=sodium salt of the Michael adduct of acrylic acid and ethylenediamine
  DBTL=dibutyltin dilaurate
  DMPA=dimethylolpropionic acid
  FC=solids content The viscosities of the dispersions were measured at 20° C. and a shear rate of $250s^{-1}$ using a rotational rheometer having concentric cylinders (spindle diameter 38.7 mm, cup diameter: 42.0 mm).

The particle size of the latex particle (LD) was determined indirectly by means of turbidity measurements. For this purpose, the turbidity of a dispersion having a solids content of 0.01% by weight was determined relative to distilled water with a path length of 2.5 cm and at room temperature.

The K value was determined by the method described in Kirk-Othmer, Encyclopedia of Chemical Technology, Third Edition, John Wiley & Sons, Inc. 1983, Volume 23, page 967. The solvent used was N-methylpyrrolidone.

We claim:

1. An aqueous polyurethane dispersion having latent crosslinking properties and containing
  I) a disperse phase (P.I), containing
    Ia) a polyurethane (PUR.Ia) which, in addition to groups which impart water dispersibility to the polyurethane, carries groups which have a C—C double bond and in which the double bond is activated by a carbonyl group bonded directly therewith, or
    Ib) a mixture of
      a polyurethane (PUR.Ib) which carries groups which impart water dispersibility to the polyurethane but not groups which have a C—C double bond and in which the double bond is activated by a carbonyl group bonded directly therewith and
      a compound (V.I) which differs from the polyurethanes PUR.Ia and PUR.Ib, and which carries groups which have a C—C double bond and in which the double bond is activated by a carbonyl group bonded directly therewith and
  II) a disperse phase (P.II) containing a compound which differs from the compounds (PUR.Ia), (PUR.Ib) and (V.I) and which carries a plurality of groups selected from the group consisting of the thiol groups, primary amino groups and secondary amino groups.

2. An aqueous dispersion as claimed in claim 1, wherein the phase (P.I) contains a polyurethane (PUR.Ia) composed of a1) polyfunctional isocyanates of 4 to 30 carbon atoms,
a2) polyols, of which
   a2.1) from 10 to 100 mol %, based on the total amount of the diols (a2), have a molecular weight of from 500 to 5000 and
   a2.2) from 0 to 90 mol %, based on the total amount of the diols (a2), have a molecular weight of from 60 to 500 g/mol,
a3) monomers which differ from the monomers (a1) and (a2) and carry at least one isocyanate group or at least one group reactive toward isocyanate groups and furthermore carry at least one hydrophilic group or one potentially hydrophilic group, imparting water-dispersibility to the polyurethanes,
a4) monomers which differ from the monomers (a1), (a2) and (a3) and carry at least one isocyanate group or at least one group reactive toward isocyanate groups which furthermore carry at least one acryloyl or methacryloyl group and
a5) if required, further polyfunctional compounds which differ from the monomers (a2) to (a4) and have groups which are reactive toward isocyanate groups and which are alcoholic hydroxyl groups or primary or secondary amino groups.

3. An aqueous dispersion as claimed in claim 1, wherein the phase (P.I) is a mixture of a polyurethane (PUR.Ib) and
a polyurethane (PUR.Ic) as compound (V.I),
the polyurethane (PUR.Ib) being composed of
b1) polyfunctional isocyanates of 4 to 30 carbon atoms,
b2) polyols, of which
   b2.1) from 10 to 100 mol %, based on the total amount of the diols (b2), have a molecular weight of from 500 to 5000 and
   b2.2) from 0 to 90 mol %, based on the total amount of the diols (b) have a molecular weight of from 60 to 500 g/mol,
b3) monomers which differ from the monomers (b1) and (b2) and have at least one isocyanate group or at least one group reactive toward isocyanate groups and furthermore carry at least one hydrophilic group or one potentially hydrophilic group imparting water-dispersibility to the polyurethanes,
b4) if required, further polyfunctional compounds which differ from the polyols (b2) and monomers (b3) and have groups which are reactive toward isocyanate and are alcoholic hydroxyl groups or primary or secondary amino groups,
and the polyurethane (PUR.Ic) being composed of
c1) polyfunctional isocyanates of 4 to 30 carbon atoms,
c2) polyols, of which
   c2.1) from 10 to 100 mol %, based on the total amount of the diols (c2), have a molecular weight of from 500 to 5000 and
   c2.2) from 0 to 90 mol %, based on the total amount of the diols (c2), have a molecular weight of from 60 to 500 g/mol,
c3) and monomers which differ from the monomers (c1) and (c2) and have at least one isocyanate group or at least one group reactive toward isocyanate groups and furthermore carry at least one acryloyl or methacryloyl group.

4. An aqueous dispersion as claimed in claim 3, wherein the monomer (a4) or (c3) is a hydroxy-$C_1$–$C_6$-alkyl acrylate, a hydroxy-$C_1$–$C_6$-alkyl methacrylate or the bisadduct of acrylic acid or methacrylic acid with a bisepoxide.

5. An aqueous dispersion as claimed in claim 1, wherein the phase (P.II) contains a polyurethane (PUR.IId) which carries groups which impart water dispersibility to the polyurethane, a polymer (POL.IIa) prepared from monomers capable of free radical polymerization and having C=C double bonds by the method of free radical emulsion or suspension polymerization or a polymer (POL.IId) which carries groups which impart water dispersibility to the polymer, prepared from monomers capable of free radical polymerization and having C=C double bonds by the method of free radical mass or solution polymerization, the polyurethane (PUR.IId) and the polymers (POL.IIa) and (POL.IIb) carrying from 0.05 to 3 mol of primary amino groups, secondary amino groups or thiol groups per kg.

6. An aqueous dispersion as claimed in claim 1, wherein the phase (P.II) contains a mixture of a polyurethane (PUR.IIe) which carries groups which impart water dispersibility to the polyurethane, a polymer (POL.IIc) prepared from monomers capable of free radical polymerization and having C=C double bonds by the method of free radical emulsion or suspension polymerization or a polymer (POL.IId) which carries groups which impart water dispersibility to the polymer, the polymer being prepared from monomers capable of free radical polymerization and having C=C double bonds by the method of free radical mass or solution polymerization, the polyurethane (PUR.IIe) or the polymers (POL.IIc) or (POL.IId) carrying less than 0.05 mol of primary amino groups, secondary amino groups or thiol groups per kg, and
a compound (V.II) which carries at least 2 groups selected from the group consisting of the thiol groups, primary amino groups or secondary amino groups and has a solubility of less than 1 g/l in water and a molecular weight of less than 10000.

7. An aqueous dispersion as claimed in claim 6, wherein the compound (V.II) is an araliphatic $C_6$–$C_{30}$-polyamine or an aliphatic $C_4$–$C_{30}$-polyamine or
an ester synthesized from a polyhydric $C_2$–$C_{10}$-alkyl alcohol and a $C_2$–$C_{10}$-thiomonocarboxylic acid.

8. An aqueous dispersion as claimed in claim 7, wherein the compound (V.II) is pentaerythrityl tetrakis-3-mercaptopropionate.

9. An article of wood, metal, textile, leather or plastic which is adhesively bonded, impregnated or coated with an aqueous dispersion as claimed in claim 1.

10. A method of coating or adhesively bonding a substrate comprising applying to said substrate an aqueous dispersion as claimed in claim 1.

* * * * *